United States Patent
Mori et al.

[11] Patent Number: 5,945,595
[45] Date of Patent: Aug. 31, 1999

[54] ONLINE ROLL PROFILE MEASURING SYSTEM AND MEASURING METHOD USING THE SAME

[75] Inventors: Shigeru Mori; Shigetoshi Kondoh, both of Hitachi, Japan

[73] Assignee: Hitachi, Ltd., Tokyo, Japan

[21] Appl. No.: 08/929,668

[22] Filed: Sep. 15, 1997

[30] Foreign Application Priority Data

Sep. 17, 1996 [JP] Japan .................................. 8-244562

[51] Int. Cl.[6] .............................. G01B 5/20; B24B 49/00
[52] U.S. Cl. .............................................................. 73/105
[58] Field of Search ................................. 73/105; 451/49, 451/142, 424

[56] References Cited

U.S. PATENT DOCUMENTS 5,562,525  10/1996  Mori et al. ................................ 451/49

FOREIGN PATENT DOCUMENTS 59-156508  9/1984  Japan .
6-47654  2/1994  Japan .

OTHER PUBLICATIONS

"Long Life Online Roller Grinder Aimed at Improvement in Productivity", Hitachi Review, vol. 75, Jun. 1993, pp. 11–14.

English version of above document—"Roll Shaping Machine for Higher Rolling Mill Productivity", Hitachi Review, vol. 42, No. 4, Aug., 1993.

*Primary Examiner*—Daniel S. Larkin
*Attorney, Agent, or Firm*—Fay, Sharpe, Beall, Fagan, Minnich & McKee

[57] ABSTRACT

An online roll profile measuring system for measuring a roll profile during rolling without the effect of an error caused by the change in rolling condition. The system includes a roll grinder unit and a grinding wheel traversing device. The roll grinder unit has a rotary grinding wheel positioned opposite to a work roll for grinding the work roll, a grinding wheel driving device for rotating the rotary grinding wheel, and a grinding wheel feeding device for pressing the rotary grinding wheel to the work roll. The grinding wheel traversing device moves the roll grinder unit in the axial direction of the work roll relative to a guide rail frame fixed on a housing holding the work roll. A roll profile is calculated, simultaneously with grinding of the work roll using the rotary grinding wheel, on the basis of movement amounts of the grinding wheel feeding device and the grinding wheel traversing device. In this system, the amount of displacement of the housing due to the change in rolling condition during measurement of the roll profile is measured by a roll position measuring device, and the roll profile measured during rolling is corrected on the basis of the amount of the displacement of the housing by an information processor.

5 Claims, 10 Drawing Sheets

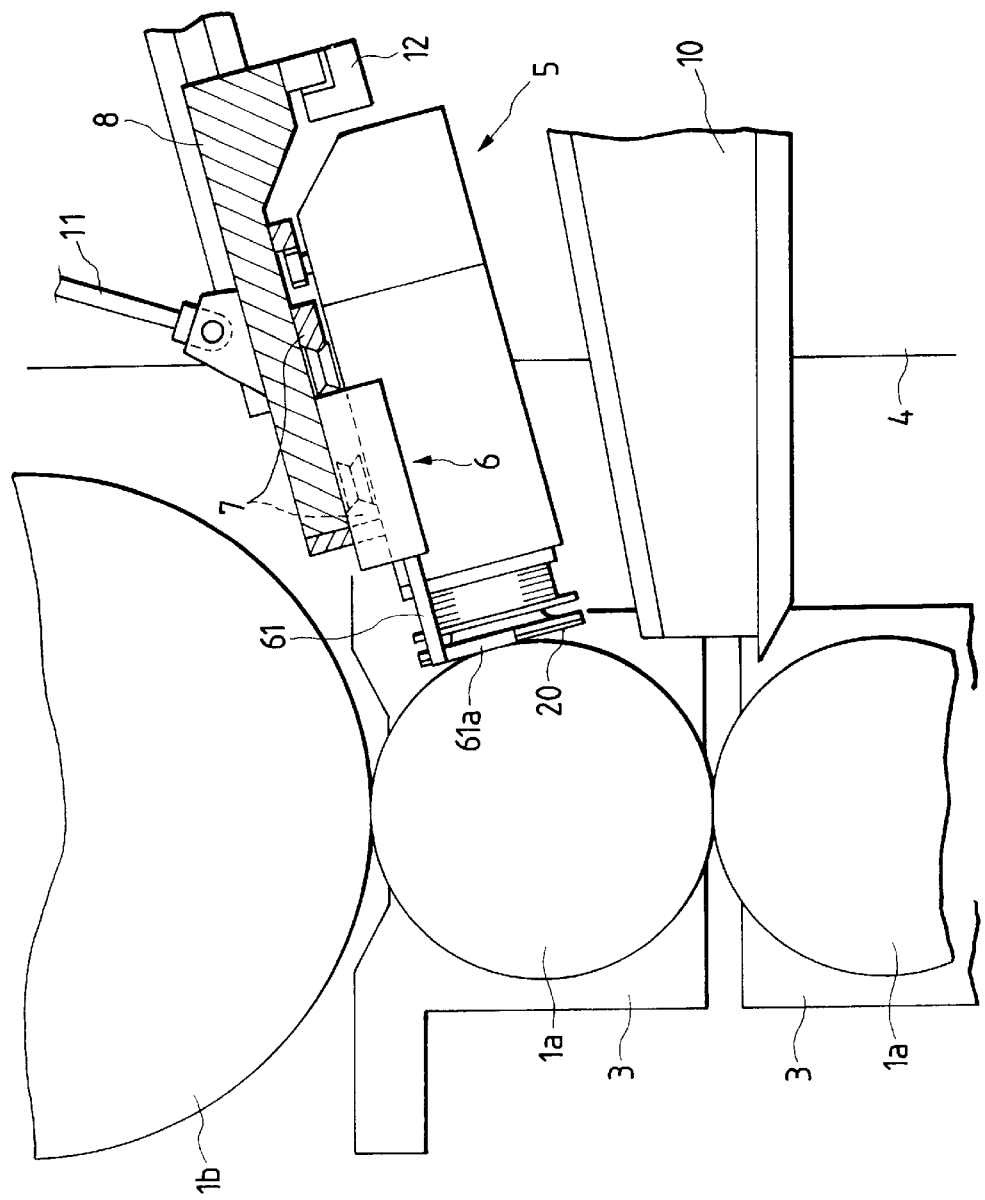

ONLINE ROLL PROFILE MEASURING SYSTEM AND MEASURING METHOD USING THE SAME

BACKGROUND OF THE INVENTION

1. Field of the Invention

The present invention relates to a roll profile measuring system for measuring a roll profile of a work roll assembled in a rolling mill and a measuring method using the system, and particularly to an online roll profile measuring system suitable for measuring a roll profile of a work roll during rolling and a measuring method using the system.

2. Description of the Related Art

In general, when work rolls assembled in a rolling mill are used for rolling a material to be rolled at a high rolling force, they are reduced in diameter locally only at portions between which the material passes by the effect of thermal expansion and/or wearing. Conventionally, a roll profile of a work roll has been calculated by a computer using measured data on thermal expansion and/or wearing of the work roll.

Such a method, however, has failed to obtain a high measurement accuracy, and therefore, various methods of measuring an actual roll profile during rolling have been proposed.

For example, one actual roll profile measuring method has been disclosed in a document entitled "Long Life Online Roll Grinder Aimed at Improvement in Productivity": Hitachi Review, Vol. 75 (June, 1993). In this method, a roll profile is calculated, simultaneously with grinding of a work roll, on the basis of data on a contact force between a rotary grinding wheel and the work roll, spring constant of the rotary grinding wheel, and pressing position of the rotary grinding wheel and movement position of a traversing device upon grinding. Hereinafter, this method is referred to as "a first method".

Another actual roll profile measuring method has been disclosed in Japanese Patent Laid-open No. Sho 59-156508. In this method, vibration generated during rotation of a work roll is regarded as a main cause of a measurement error of a roll profile. Specifically, sensors for measuring a movement amount of a work roll due to looseness at two portions of an end portion of the work roll in the X and Y directions are provided on a work roll profile measuring frame, and a mark is provided on the outer periphery of the work roll for measuring the rotating angle of the work roll, wherein the mark is measured by the sensors fixed on the frame. Hereinafter, this method is referred to as "a second method".

The first method is allowed to actually measure a roll profile in a condition that a distance between the work roll and a guide rail for moving a roll grinder unit containing the rotary grinding wheel in the axial direction of the work roll remains unchanged. Specifically, in this method, since the roll profile of the work roll is measured during idling in which the rolling condition is not changed, a housing is not deformed and/or the work roll is not moved in the vertical direction due to the change in strip thickness. As a result, the online roll profile of the work roll can be calculated by eliminating, from the state of the work roll before rolling, the changed amount of the work roll due to wearing and/or thermal expansion caused by rolling.

In a rolling mill, there exists an idling time of work rolls from at the time when a material is thinly rolled to the time when the next material is bitten in the rolling mill. The roll profile of a work roll may be measured by making use of the idling time. Specifically, for such an idling time, the work roll is ground at a specific pressing force and simultaneously the roll profile is calculated on the basis of movement amounts of a pressing device and a traversing device. This makes it possible to obtain an accurate roll profile because the rolling condition is not changed for the idling time.

However, with an increase in productivity, the idling time tends to be shortened, and thereby it becomes difficult to grind the entire length of a work roll for the idling time. For this reason, it is required to measure an accurate roll profile of a work roll simultaneously with grinding of the work roll during rolling.

In the case where a work roll is ground in a state that the online roll grind unit is fixed on a housing, since the housing is deformed due to the change in rolling condition during rolling, the distance between the guide rail and the work roll is slightly changed. As a result, there occurs a problem that the roll profile of the work roll measured simultaneously with grinding of the work roll during rolling contains not only the changed amount of the work roll based on the state before rolling due to the thermal effect and/or wearing caused by rolling but also an error due to displacement of the housing caused by the change in rolling condition during rolling, that is, the change in distance between the guide rail and the work roll.

Incidentally, since the work roll is rotated in chocks, there occurs a run-out of the rotating work roll by the presence of gaps between the chocks and bearings and gaps in the bearings. To prevent occurrence of measurement errors of the roll profile due to the run-out of the work roll and the eccentricity of the work roll, according to the above-described second method, there is provided the sensor for measuring the rotational position of the work roll and the amount of run-out of the work roll.

The run-out and eccentricity of the work roll, however, can be electrically processed without provision of the sensor because the amount of run-out of the work roll can be made constant by increasing the rotational speed of the work roll. And, the second method fails to solve the above-described problem that the roll profile of the work roll measured simultaneously with grinding of the work roll during rolling contains an error due to displacement of the housing caused by the change in rolling condition during rolling, that is, the change in distance between the guide rail and the work roll during rolling.

SUMMARY OF THE INVENTION

An object of the present invention is to provide an online roll profile measuring system intended to measure a roll profile of a work roll during rolling without an effect of an error caused by a change in the rolling condition, and a measuring method using the system.

To achieve the above object, according to a first aspect of the present invention, there is provided an online roll profile measuring system including: a roll grinder unit including a rotary grinding wheel positioned opposite to a work roll for grinding the work roll, a grinding wheel driving device for rotating the rotary grinding wheel, and a grinding wheel feeding device for pressing the grinding wheel to the work roll; and a traversing device for moving the roll grinder unit in the axial direction of the work roll relative to a guide rail frame fixed on a housing for holding the work roll; wherein a roll profile is measured, simultaneously with grinding of the work roll, on the basis of movement amounts of the grinding wheel feeding device and the traversing device; characterized by further including: a measuring means for measuring the amount of displacement of the housing depending on the change in rolling condition during measurement of the roll profile; and a processing means for correcting the roll profile obtained during rolling on the basis of the amount of the displacement of the housing measured by the measuring means. With this configuration, an accurate roll profile can be obtained by eliminating, from the measured roll profile, the amount of the displacement of the housing due to the change in rolling condition.

In the above online roll profile measuring system, preferably, the measuring means is composed of a roll position measuring means mounted on the guide rail frame for measuring the change in distance between the guide rail frame and the work roll. With this configuration, the roll profile can be accurately obtained by directly measuring the change in distance between the guide rail frame and the work roll.

In the online roll profile measuring system, preferably, the roll position measuring means includes a contact tool which is brought in contact with the work roll and displaced on the basis of the change in distance between the guide rail frame and the work roll, and a displacement sensor for detecting the displaced amount of the contact tool.

In the online roll profile measuring system, preferably, the roll position measuring means is composed of a non-contact type sensor disposed in proximity to the work roll.

In the online roll profile measuring system, preferably, the measuring means includes a load cell mounted on the housing for measuring a rolling force during rolling, and a calculating means for calculating the amount of the displacement of the housing using a signal of a rolling force measured by the load cell and calculating the changed amount of the distance between the guide rail frame and the work roll on the basis of the amount of the displacement the housing. With this configuration, the roll profile can be measured using the existing load cell without provision of any special measuring device.

To achieve the above object, according to a second aspect of the present invention, there is provided an online roll profile measuring system including: a roll grinder unit including a rotary grinding wheel positioned opposite to a work roll for grinding the work roll, a grinding wheel driving device for rotating the rotary grinding wheel, and a grinding wheel feeding device for pressing the grinding wheel to the work roll; and a traversing device for moving the roll grinder unit in the axial direction of the work roll relative to a guide rail frame fixed on a housing for holding the work roll; wherein a roll profile is measured, simultaneously with grinding of the work roll, on the basis of movement amounts of the grinding wheel feeding device and the traversing device; characterized in that the guide rail frame is fixed on a chock for rotatably fixing the work roll in such a manner as to be pressed to the chock; and a roll profile of the work roll during rolling is measured simultaneously with grinding of the work roll by the roll grinder unit moved in the axial direction of the work roll. With this configuration, an accurate roll profile can be measured without the effect of displacement of the housing caused by the change in rolling condition.

The present invention also provides an online roll profile measuring system for measuring during rolling a roll profile of a work roll held in a housing, including: a measuring device for measuring the amount of displacement of the housing in the rolling direction; and a processing means for correcting the measured value of the roll profile on the basis of the amount of displacement of the housing.

The present invention also provides an online roll profile measuring system, fixed in a housing, for measuring during rolling a roll profile of a work roll held in the housing, including: a measuring device for measuring the amount of displacement of the housing in the rolling direction due to the change in rolling force; and a processing means for correcting the measured value of the roll profile on the basis of the amount of displacement of the housing.

The present invention also provides an online roll profile measuring method using an online roll profile measuring system for measuring during rolling a roll profile of a work roll held in a housing, including the step o f: measuring the amount of displacement of the housing in the rolling direction; and correcting the measured value of the roll profile on the basis of the measured amount of displacement of the housing.

The present invention also provides an online roll profile measuring method using an online roll profile measuring system fixed in a housing for measuring during rolling a roll profile of a work roll held in the housing, including the step of: correcting the measured value of the roll profile on the basis of the change in rolling force.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 5 is a partial sectional side view of essential portions of the rolling mill including the online roll profile measuring system according to the first embodiment, in which a contact type roll position measuring device is assembled;

DETAILED DESCRIPTION OF THE PREFERRED EMBODIMENTS

Hereinafter, an online roll profile measuring system according to a first embodiment of the present invention will be described with reference to FIGS. 1 to 12.

First, the entire configuration of a rolling mill used in the present invention will be described with reference to FIG. 1.

Figure 1:
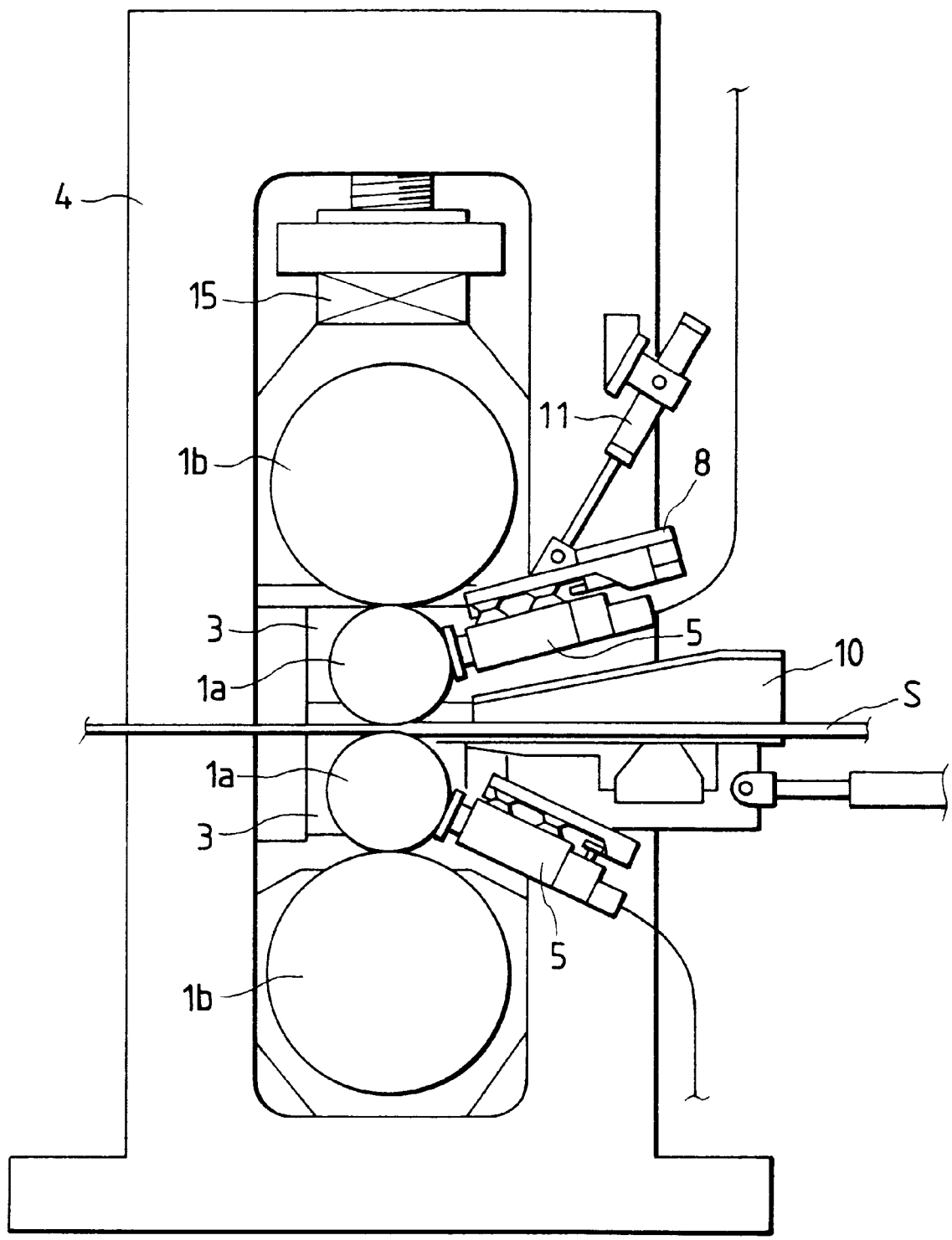
FIG. 1 is a sectional side view of a rolling mill including an online roll profile measuring system according to a first embodiment of the present invention, which is also used for a description of an online roll profile measuring system according to a second embodiment of the present invention.

FIG. 1 is a sectional side view of the rolling mill including the online roll profile measuring system according to the first embodiment.

Referring to FIG. 1, there is shown the rolling mill which is represented by a four-stage rolling mill having a pair of work rolls 1a for rolling a material S to be rolled and a pair of upper and lower back-up rolls 1b for supporting the work rolls 1a.

Each work roll 1a is rotatably supported by chocks 3. The chocks 3 are assembled in a housing 4. An inlet side guide 10 is disposed on the inlet side of the rolling mill for guiding the material S into a gap between the work rolls 1a. A load cell 15 for measuring a rolling force generated upon rolling is provided to the housing 4.

The rolling mill is also provided with the online roll profile measuring system according to the first embodiment. The online roll profile measuring system has one or a plurality of roll grinder units 5 for each work roll 1a. The system shown in FIG. 1 has two pieces of the roll grinder units 5 for individually online-grinding the upper and lower work rolls 1a.

The following description will be made by example of grinding of the upper work roll 1a.

The structure of the roll grinder unit 5 will be briefly described with reference to FIGS. 2 and 3. It is to be noted that the detailed structure and action of the roll grinder unit 5 are described in Japanese Patent Laid-open No. Hei 6-47654.

Figure 2:
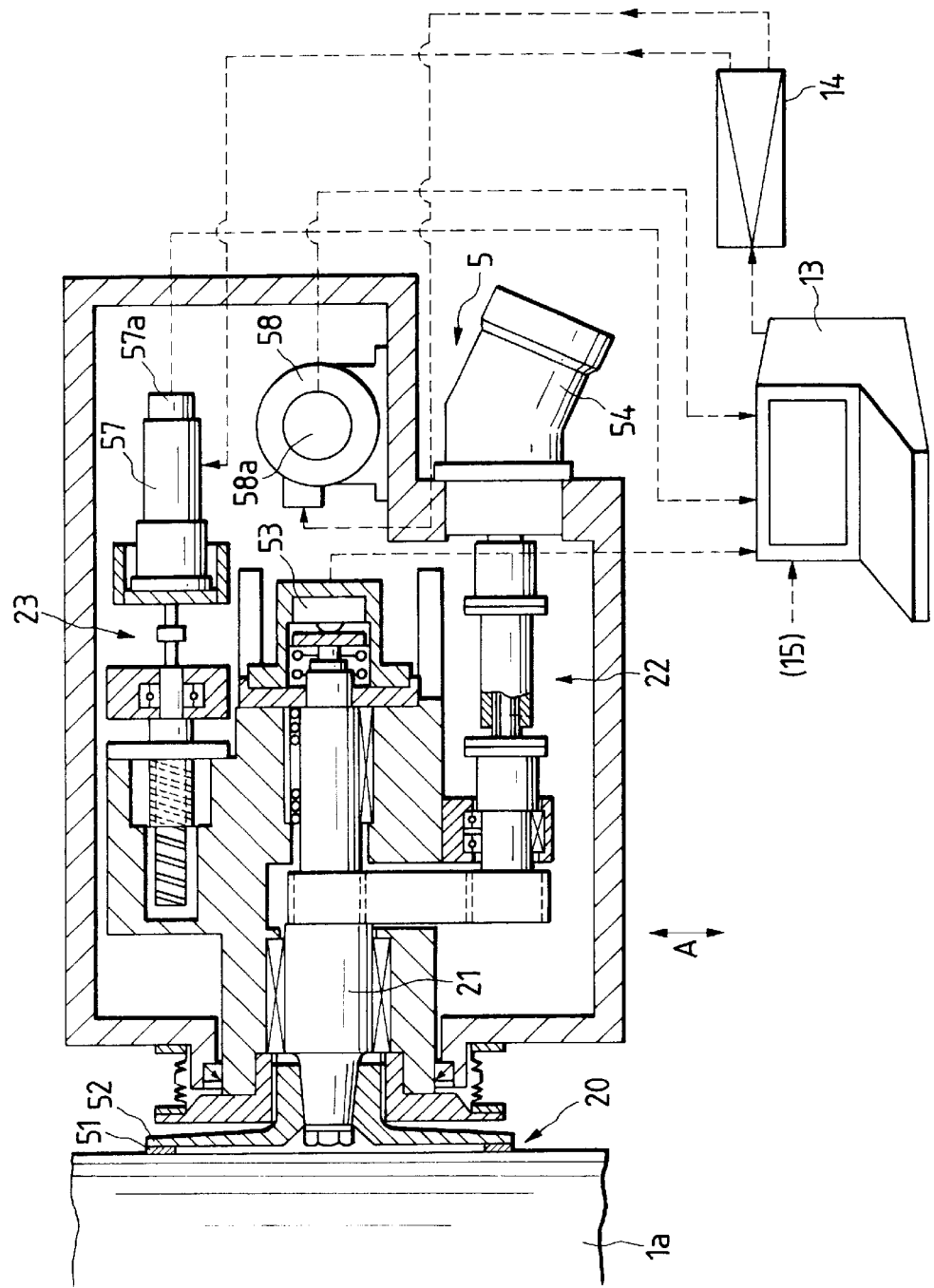
FIG. 2 is a transverse sectional view of a roll grinder unit of the online roll profile measuring system according to the first embodiment, which is also used for a description of the online roll profile measuring system according to the second embodiment.
Figure 3:
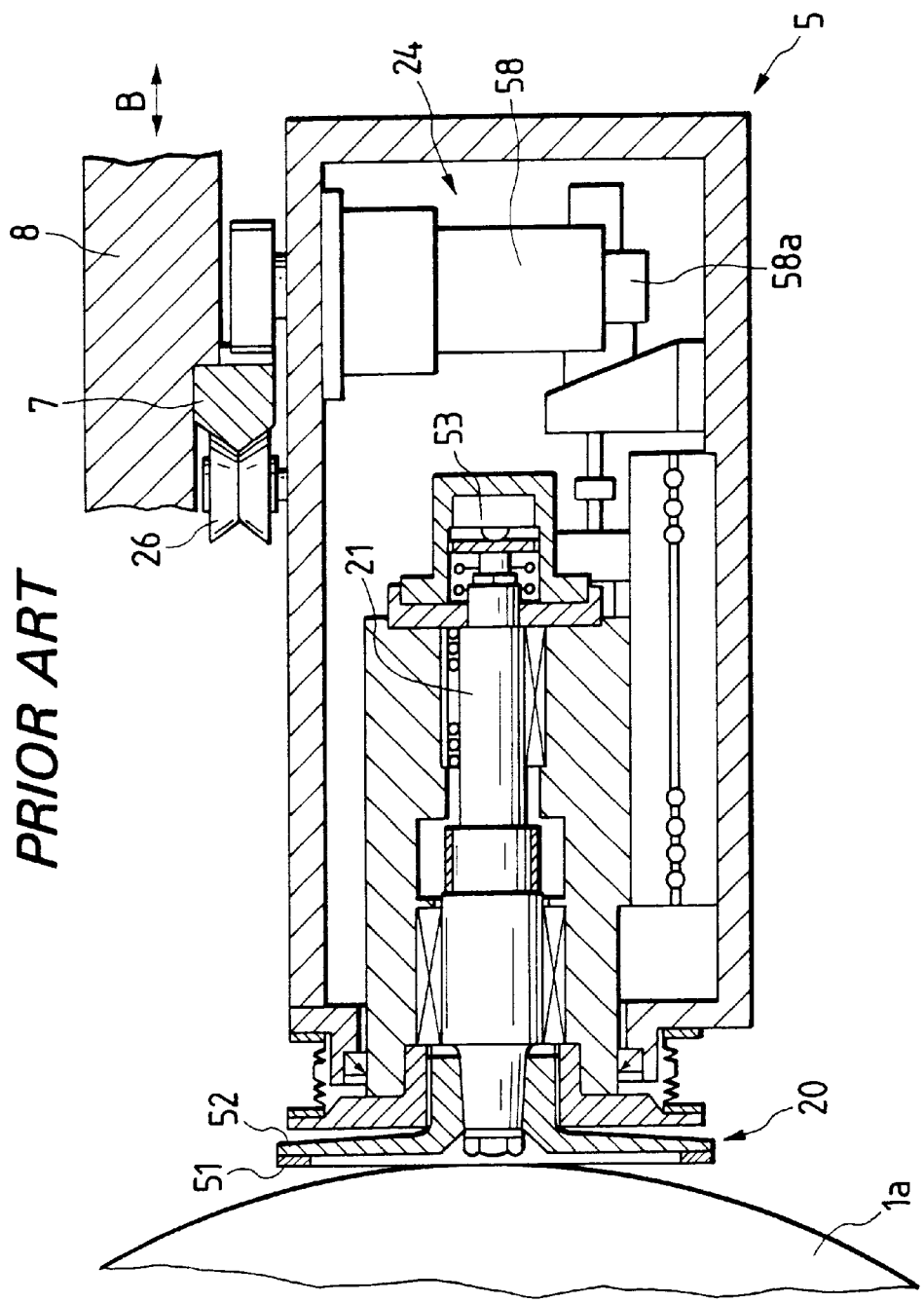
FIG. 3 is a vertical sectional view of the roll grinder unit shown in FIG. 2.

FIGS. 2 and 3 are a transverse sectional view and a vertical sectional view of the roll grinder unit used for the online roll profile measuring system according to the first embodiment, respectively.

As shown in FIG. 2, the roll grinder unit 5 includes a plane type rotary grinding wheel 20 for grinding the work roll 1a. The rotary grinding wheel 20 is rotated by a grinding wheel driving device 22 through a grinding wheel rotating shaft 21. The rotary grinding wheel 20 is pressed to the work roll 1a by a grinding wheel feeding device 23. The rotary grinding wheel 20 is movable in the axial direction (shown by an arrow A in FIG. 2) of the work roll 1a, and a grinding wheel traversing device 24 (which will be described later with reference to FIG. 3) is provided for moving the rotary grinding wheel 20.

The rotary grinding wheel 20 includes a grindstone layer 51 made from diamond or CBN (Cubic Boron Nitride), and a thin disk 52 for supporting the grindstone layer 51. The thin disk 52 is disposed between the grindstone layer 51 and the grinding wheel rotating shaft 21. The thin disk 52, which is made from an elastic material, has a function of absorbing vibration of the work roll 1a because the deflected amount of the thin disk 52 is changed in proportion to a contact force between the work roll 1a and the rotary grinding wheel 20. The grinding wheel rotating shaft 21 is tilted a very small angle with respect to the direction perpendicular to the axial line of the work roll 1a for bringing only one side of the rotary grinding wheel 20 in contact with the work roll 1a. This is fully shown in FIG. 6 of the above-described document, Japanese Patent Laid-open No. Hei 6-47654.

A hydraulic motor 54 is mounted on the grinding wheel driving device 22 for rotating the rotary grinding wheel 20 at a specific peripheral speed. A load cell 53 for measuring the contact force between the rotary grinding wheel 20 and the work roll 1a is disposed at an end portion of the grinding wheel rotating shaft 21 on the opposed side to the rotary grinding wheel.

A feed motor 57 is mounted on the grinding wheel feeding device 23 for pressing or separating the rotary grinding wheel 20 to or from the work roll 1a. The feed motor 57 has an encoder 57a for measuring the rotating angle of the feed motor 57.

The grinding wheel traversing device 24, which will be described later with reference to FIG. 3, is rotated by a traverse motor 58. The rotating angle of the traverse motor 58 is measured by an encoder 58a.

Information obtained at both the load cell 53, and encoders 57a and 58a is inputted into an information processor 13. The information processor 13 outputs a rotation control signal to both of the feed motor 57 and the traverse motor 58 through an amplifier 14.

Next, the grinding wheel traversing device 24 will be described with reference to FIG. 3. In FIG. 3, parts corresponding to those in FIG. 2 are indicated by the same characters.

As shown in FIG. 3, the roll grinder unit 5 includes the grinding wheel traversing device 24 for moving the rotary grinding wheel 20 in the axial direction of the work roll 1a. The grinding wheel traversing device 24 is rotated by the traverse motor 58, and the rotating angle of the traverse motor 58 is measured by the encoder 58a.

The roll grinder unit 5 has wheels 26 movably mounted on guide rails 7 extending from one end to the other end of the work roll 1a in the axial direction. The guide rails 7 are mounted on a guide rail frame 8 movable close to or apart from the work roll 1a. The guide rail frame 8 is movable in the direction shown by an arrow B by the cylinder 11 shown in FIG. 1, and it is fixed on the housing 4 in a state being pressed to the stopper 12 (see FIG. 5) mounted on the housing 4.

Next, a method of measuring a roll profile during grinding using the online roll profile measuring system will be described in relation to a measurement error caused by the change in rolling condition.

The work roll 1a prepared on the off-line is ground into a target roll profile by an off-line roll grinder (not shown). The roll profile of the work roll 1a thus ground is inputted into the information processor 13. Then, the work roll 1a is inserted in the rolling mill, and before start of rolling, the work roll 1a is ground by the roll grinder unit 5 of the online roll profile measuring system for measuring the roll profile by the online roll profile measuring system.

If the roll profile thus measured is different from the off-line roll profile inputted into the information processor 13, it is decided that there exists an error in terms of straightness of the guide rails 7. The error is recognized and stored in the information processor 13. The error in straightness of the guide rails 7 is eliminated from the measured roll profile data. The method of correcting the roll profile has been described in detail in the above-described document, Japanese Patent Laid-open No. Hei 6-47654.

A plurality of coils are then rolled between the upper work roll 1a and the mating one (lower work roll 1a) inserted in the rolling mill, and thereafter, the work roll 1a is grounded by the roll grinder unit 5 for measuring the roll profile of the work roll 1a. If the roll profile thus measured is different from that measured before rolling, it is decided that there occurs a change in shape of the work roll 1a due to thermal effect and/or wearing caused during rolling. If grinding of the work roll 1a after rolling a plurality of coils is performed in a period from the time when the material S to be rolled passes through the work roll 1a and the mating one to the time when the next material S is bitten between the work roll 1a and the mating one, the roll profile measurement data is not affected by the change in rolling condition. However, when the roll profile of the work roll 1a is measured simultaneously with grinding of the work roll 1a in the state that the material S is bitten between the work roll 1a and the mating one, that is, in the rolling state, the roll profile measurement data contain, as measurement errors, not only the change in shape of the work roll 1a caused by thermal effect and/or wearing but also the change in rolling condition. As a result, to measure an accurate roll profile of the work roll 1a during rolling simultaneously with grinding of the work roll 1a, it is necessary to eliminate the measurement error caused by the change in rolling condition.

The measurement error of a roll profile, caused by the change in rolling condition, will be described with reference to FIGS. 4A and 4B.

Figure 4A:
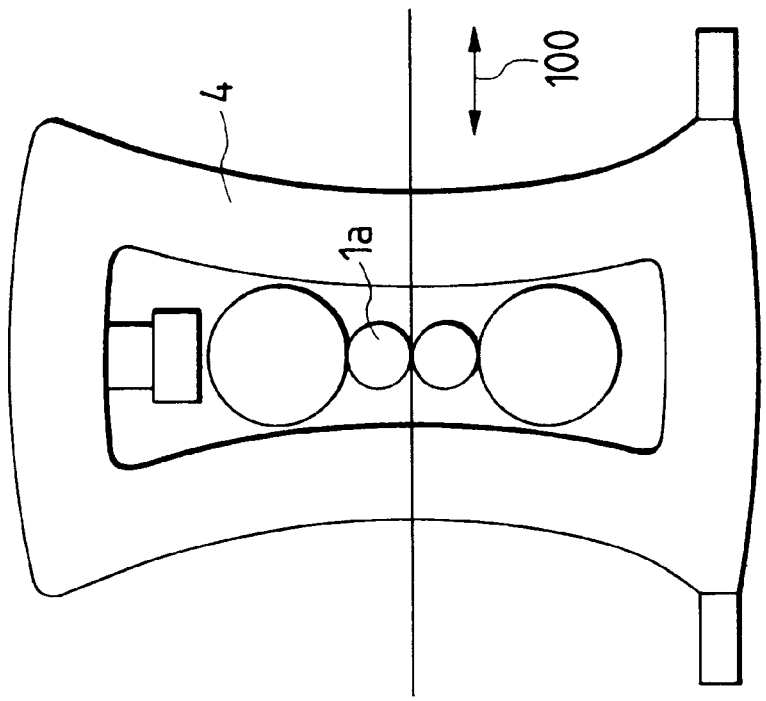
FIGS. 4A and 4B are views illustrating displacement of a housing by the effect of a rolling force.
Figure 4B:
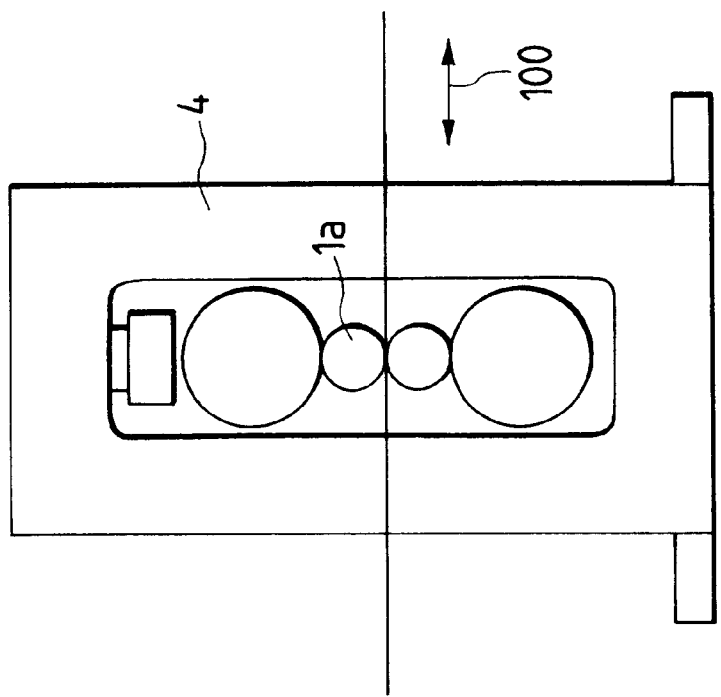

FIGS. 4A and 4B are views illustrating displacement of the housing caused by the effect of a rolling force.

FIG. 4A shows the housing 4 assembled with the rolls 1a in the idling state. On rolling, such a housing 4 is applied with a rolling force, with a result that as shown in FIG. 4B, it is vertically elongated or cambered inward at a central portion thereof.

When the work roll 1a is ground in the state that the guide rail frame 8 of the online roll profile measuring system is fixedly positioned on the housing 4, the displacement of the housing 4 due to a rolling force causes the guide rail frame 8 to be slightly moved mainly in the running direction of the material to be rolled, that is, in the rolling direction 100. In the case where the work roll 1a is ground during rolling, if the rolling force is constant in a period from the start of grinding to the end of grinding, the displacement of the housing 4 is correspondingly constant. In this case, although the absolute position of the guide rail frame 8 is changed, the relative positional relationship between the work roll 1a and the guide rail frame 8 is not changed during grinding.

In measurement of the roll profile using the online roll profile measuring system, the change in relative positional relationship between the work roll 1a and the guide rail frame 8 during grinding is regarded as the change in shape of the work roll 1a and is calculated. As a result, if the rolling force is constant, the displacement of the housing 4 does not lead to a measurement error of the roll profile. However, if there exists, for example, uneven heating of the material S to be rolled, the rolling force is changed. The rolling force is higher at a lower temperature portion of the material S and it is lower at a higher temperature portion of the material S. In general, such changes in rolling force are repeated five or six times for one coil.

When the rolling force is changed, the amount of displacement of the housing 4 is changed depending on the change in rolling force, and consequently the guide rail frame 8 mounted on the housing 4 is slightly moved in the direction perpendicular to the axial line of the work roll 1a depending on the change in rolling force. With the movement of the guide rail frame 8, the guide rails 7 mounted on the guide rail frame 8 are moved, as a result of which the roll grinder unit 5 mounted on the guide rails 7 is also moved.

When the guide rail frame 8 is moved as described above upon measurement of the roll profile, the roll grinder unit 5 is correspondingly moved in the direction perpendicular to the axial line of the work roll 1a, that is, in the running direction of the work roll 1a (the rolling direction 100). As a result, to bring the rotary grinding wheel 20 in contact with the work roll 1a at a specific contact force, the rotary grinding wheel 20 is moved in proportion to the moved amount of the roll grinder unit 5 by rotating the feed motor 57 of the grinding wheel feeding device 23. The rotating angle of the feed motor 57 is supplied from the encoder 57a to the information processor 13.

A roll profile Z(X) of the work roll 1a is obtained by the information processor 13 on the basis of the following equation (1).

$$Z(X)=S(X)-F(X)/K \quad (1)$$

Here, S(X) indicates a positional signal of the grinding wheel feeding device 23 for feeding the rotary grinding wheel 20. The signal S(X) is supplied from the encoder 57a to the information processor 13 and is calculated as the change in roll profile of the work roll 1a, F(X) indicates a contact force between the work roll 1a and the rotary grinding wheel 20, and K is a spring constant of the rotary grinding wheel 20. The information processor 13 controls the term F(X)/K such that it remains unchanged, and accordingly, when the position of the rotary grinding wheel 20 is moved in the direction perpendicular to the axial line of the work roll 1a, the signal S(X) is changed and the information processor 13 recognizes that the work roll 1a has irregularities.

Thus, as described above, the positional signal S(X) contains as an error the moved amount of the roll grinder unit 5 due to a slight movement of the guide rail frame 8 depending on the change in rolling condition, that is, the change in rolling force. The above error becomes a measurement error of a roll profile due to the change in rolling condition.

Next, there will be described a method of correcting a measurement error of a roll profile depending on the change in rolling condition using a contact type roll position measuring device with reference to FIGS. 5 to 10.

First, the configuration of the contact type roll position measuring device assembled in the online roll profile measuring system according to the first embodiment of the present invention will be described with reference to FIGS. 5 and 6.

Figure 6:
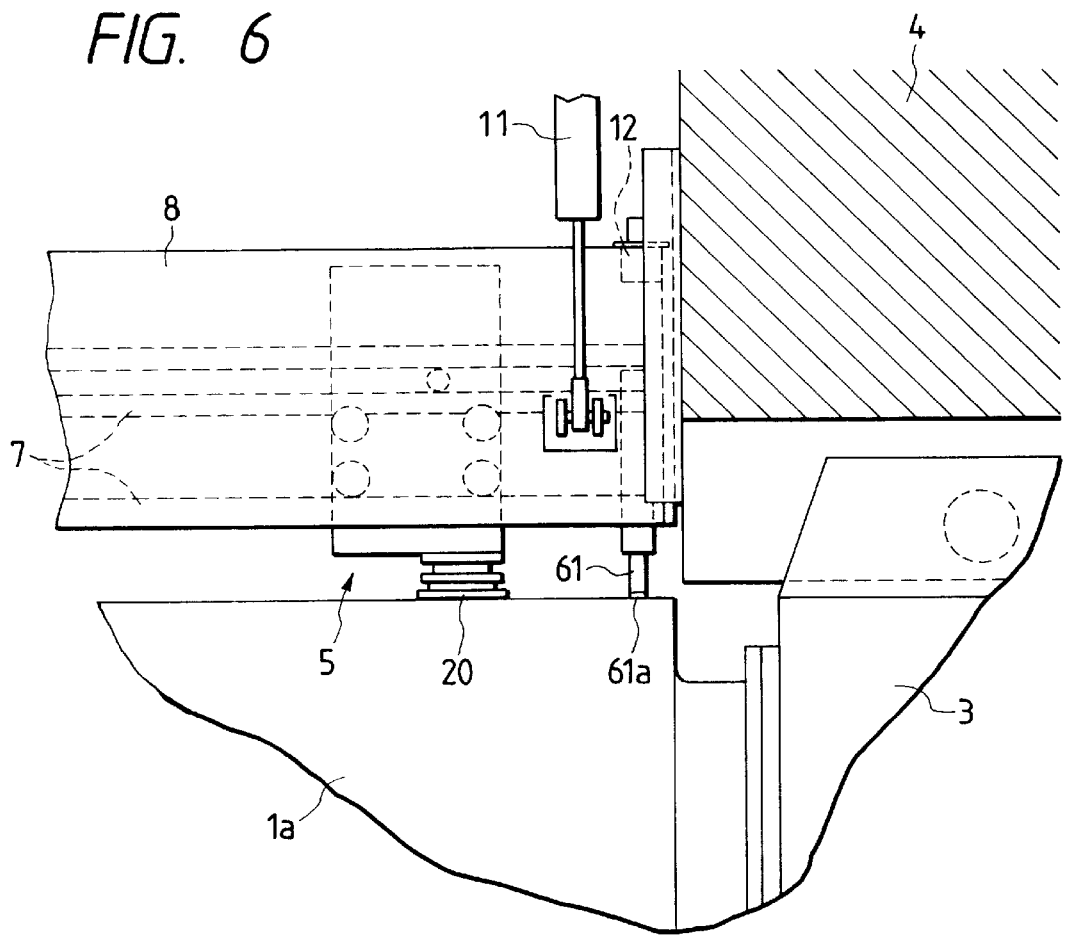
FIG. 6 is a partial sectional plan view of FIG. 5.

FIGS. 5 and 6 are a partial sectional side view and a partial plan view of essential portions of the rolling mill including the online roll profile measuring system of the first embodiment in which the contact type roll position measuring device is assembled, respectively.

In this embodiment, to eliminate a measurement error of the roll profile due to the change in rolling condition, the moved amount of each guide rail 7 mounted on the guide rail frame 8, which is a cause of the error, is measured by the contact type roll position measuring device, and the positional signal S(X) equivalent to the error is eliminated from the equation (1).

To measure the change in distance between the guide rail 7 and the work roll 1a, a roll position measuring device 6 is mounted on the guide rail frame 8. The roll position measuring device 6 is mounted at an end portion of the guide rail frame 8 along the axial direction of the roll for preventing interference with the roll grinder unit 5.

Referring to FIG. 5, a pair of the rolls 1a for rolling a material to be rolled is rotatably supported in the chocks 3. The chocks 3 are assembled in the housing 4. The inlet side guide 10 is disposed on the inlet side of the rolling mill. The rolls 1a are supported by the upper and lower back-up rolls 1b.

The roll grinder unit 5 is movably mounted on the guide rails 7 extending from one end to the other end of the work roll 1a along the axial direction. The guide rails 7 are mounted on the guide rail frame 8 movable close to or apart from the work roll 1a. The guide rail frame 8 is movable by the cylinder 11, and upon grinding, it is fixed on the housing 4 in a state being pressed to the stopper 12 mounted on the housing 4.

The contact type roll position measuring device 6 is mounted on an end portion of the guide rail frame 8, and upon grinding, it is pushed on the work roll 1a side by the cylinder 11 together with the roll grinder unit 5 and the guide rail frame 8. The contact type roll position measuring device 6 is fixedly positioned by the stopper 12 mounted on the housing 4.

The contact type roll position measuring device 6 includes a contact tool 61a brought in contact with the work roll 1a, and a sensor rod 61 fixed on the contact tool 61a. The sensor rod 61 is movable in the axial direction, and it is usually biased such that the contact tool 61a is pressed to the work roll 1a. When a distance between the housing 4 and the work roll 1a is changed due to the change in rolling condition, the sensor rod 61 is slid depending on the change in such a distance. The guiding movement of the sensor rod 61 is measured by the contact type roll position measuring device 6, and a measurement error of the roll profile due to the change in rolling condition is thus detected. The detailed configuration of the contact type roll position measuring device 6 will be described in detail with reference to FIG. 11.

In FIG. 6, parts corresponding to those shown in FIG. 5 are indicated by the same characters. As shown in FIG. 6, the contact type roll position measuring device 6 is located at an end portion of the work roll 1a. In addition, although only one contact type roll position measuring device 6 is shown in FIG. 6, two pieces of the devices 6 are actually provided on both end portions of the work roll 1a.

The sensor rod 61 of the contact type roll position measuring device 6 advances on the work roll 1a side before start of the roll profile measurement, and the contact tool 61a is brought in contact with the work roll 1a. As the contact type roll position measuring device 6 starts to measure the change in distance between the guide rail 7 of the housing 4 and the work roll 1a, the rotary grinding wheel 20 of the roll grinder unit 5 is brought in contact with the work roll 1a for measuring the roll profile simultaneously with grinding of the work roll 1a. After completion of measurement, both the rotary grinding wheel 20 and the sensor rod 61 are retreated. The contact type roll position measuring device 6 measures only the end portion of the work roll 1a without movement in the axial direction of the work roll 1a.

The principle of detecting an error of the roll profile using the contact type roll position measuring device 6 will be described below with reference to FIG. 7.

Figure 7:
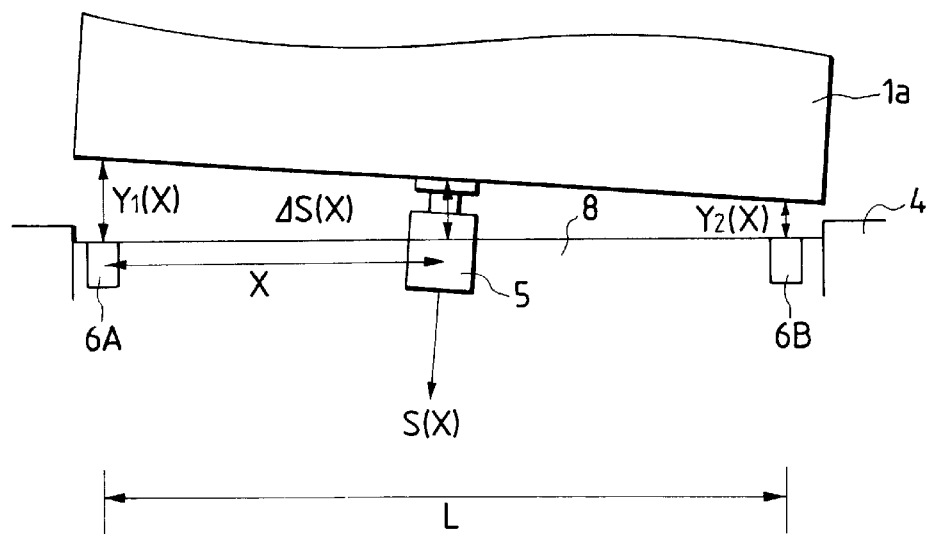
FIG. 7 is a view illustrating the principle of detecting an error of a roll profile using the contact type roll position measuring device according to the first embodiment.

FIG. 7 is a view illustrating the principle of detecting an error of the roll profile using the contact type roll position measuring device 6 assembled in the online roll profile measuring system according to the first embodiment of the present invention. In the example shown in FIG. 7, the contact type roll position measuring device 6 is composed of contact type roll position measuring devices 6A and 6B mounted on both end sides of the guide rail frame 8 fixed on the housing 4.

In FIG. 7, the roll grinder unit 5 is moved in the axial direction of the work roll 1a along the guide frame 8, and it outputs a signal S(X) at a position apart a distance X from the contact type roll position measuring device 6A.

As described with reference to FIGS. 5 and 6, the contact type roll position measuring device 6A measures a distance Y1(X) between the guide rail frame 8 and the one end portion of the work roll 1a, and the contact type roll position measuring device 6B measures a distance Y2(X) between the guide rail frame 8 and the other end portion of the work roll 1a.

The distances Y1(X) and Y2(X) are changed by arbitrary movement of the work roll 1a. Here, a distance ΔS(X) between the guide rail frame 8 and the work roll 1a when the roll grinder unit 5 is located at a position X is obtained on the basis of an equation (2) using the outputs Y1(X) and Y2(X) of the contact type roll position measuring devices 6A and 6B when the roll grinder unit 5 is located at the position X.

$$\Delta S(X) = Y1(X) - [(Y2(X) - Y1(X))/L] \cdot X \qquad (2)$$

Here, L indicates a distance between the contact type roll position measuring devices 6A and 6B.

The distance ΔS(X) is an error of the roll profile depending on the change in rolling condition. Accordingly, the information processor 13 can calculate the roll profile Z(X) on the basis of an equation (3).

$$Z(X) = S(X) - \Delta S(X) - F(X)/K \qquad (3)$$

Next, there will be described the terms S(X), Δ S(X) and Z(X) in the equation (3) with reference to FIGS. 8 to 10.

Figure 8:
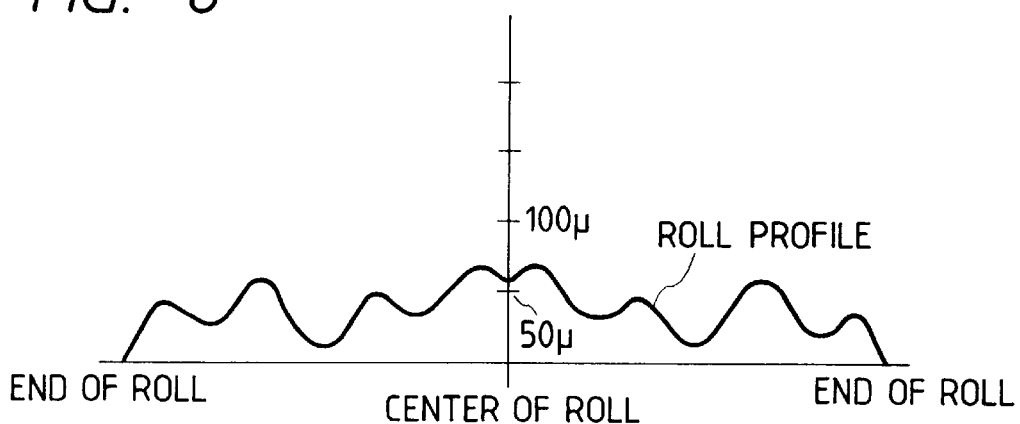
FIG. 8 is a diagram illustrating a signal S(X) measured by the roll grinder unit according to the first embodiment.

FIG. 8 is a diagram illustrating the signal S(X) measured by the roll grinder unit 5 according to the first embodiment of the present invention; FIG. 9 is a diagram illustrating the signal ΔS(X) detected using the contact type roll position measuring devices 6A and 6B assembled in the roll grinder unit 5; and FIG. 10 is a diagram illustrating the roll profile Z(X) obtained by the information processor according to the first embodiment of the present invention.

As shown in FIG. 8, an error due to the change in rolling condition is superimposed on the roll profile which is measured without correction in terms of an error in distance between the guide rail frame 8 and the work roll 1a.

Figure 9:
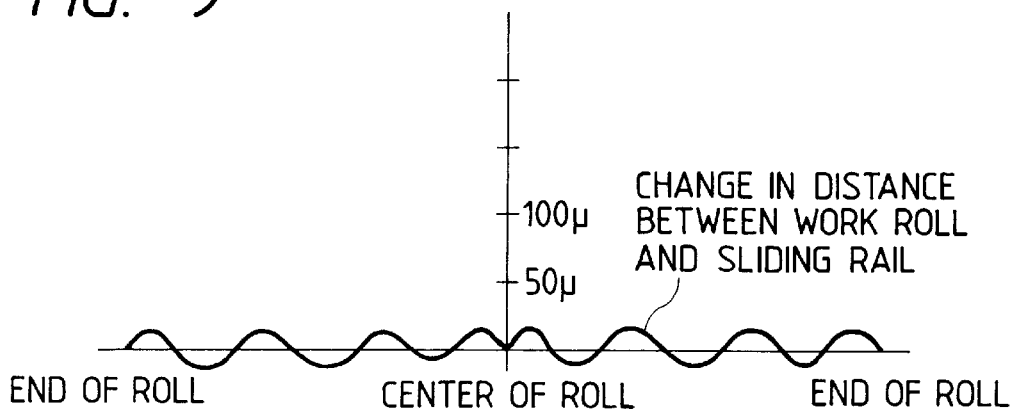
FIG. 9 is a diagram illustrating a signal $\Delta S(X)$ measured by contact type roll position measuring devices provided on both end portions of a guide rail frame according to the first embodiment.
Figure 10:
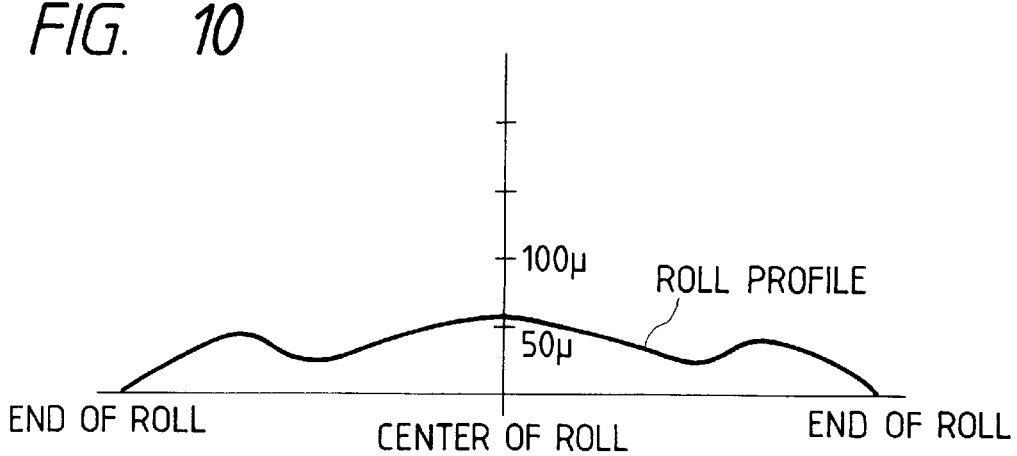
FIG. 10 is a diagram illustrating a roll profile Z(X) calculated by an information processor according to the first embodiment.

The data on the change in distance between the guide rail 7 and the work roll 1a depending on the change in rolling condition, which is measured by the roll position measuring device 6, are shown in FIG. 9.

Accordingly, the roll profile from which the change in distance between the guide rail frame 8 and the work roll 1a depending on the change in rolling condition is eliminated, is obtained by subtracting the error shown in FIG. 9 from the roll profile shown in FIG. 8.

In the above description, two pieces of the roll position measuring devices 6A and 6B are mounted on one work roll 1a. The reason for this is that as described with reference to FIG. 7, in the case where the work roll 1a is tilted with respect to the guide rail frame 8, the two distances Y1(X) and Y2(X) must be measured. However, since the change in distance between the guide rail frame 8 and the work roll 1a on the operating side is nearly equal to that on the driving side, that is, the work roll 1a is moved in parallel to the guide rail frame 8, the error A S(X) can be measured only by use of one roll position measuring device.

As described above, the change in distance between the guide rail frame 8 and the work roll 1a caused by the change in rolling condition is separated from the roll profile data, and the true change in roll profile due to the thermal effect and/or wearing of the work roll 1a is calculated and displayed.

The configuration of the contact type roll position measuring device 6 will be described below with reference to FIG. 11.

Figure 11:
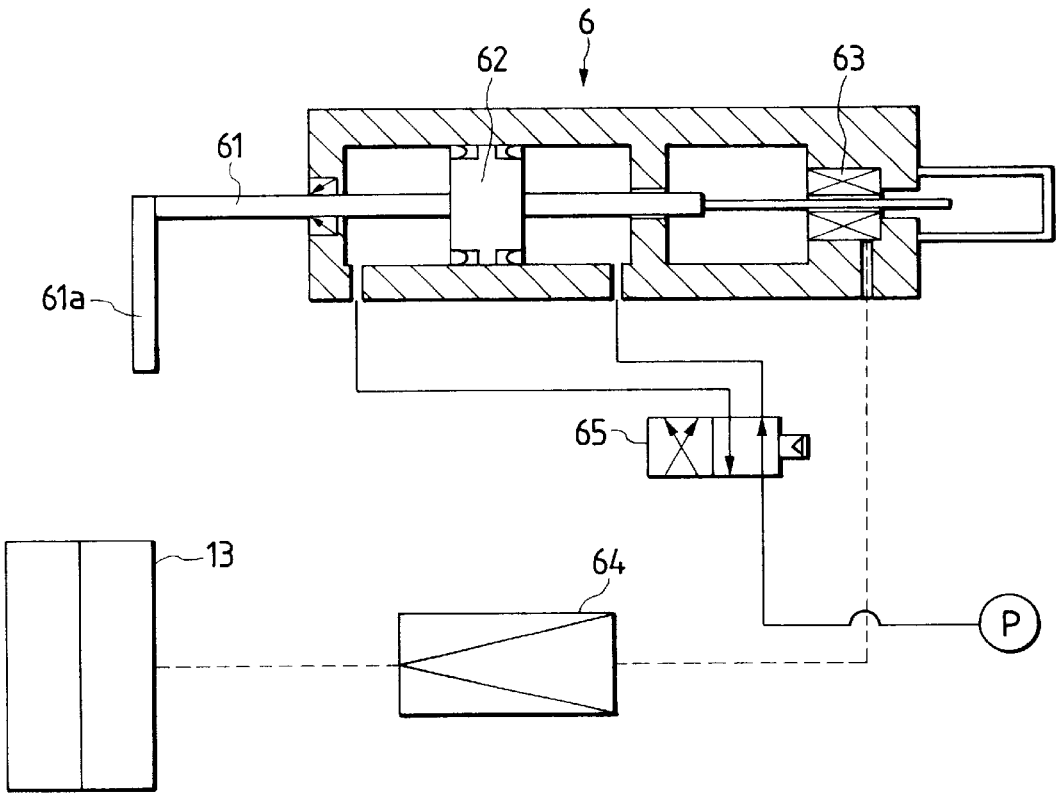
FIG. 11 is a vertical sectional view showing the system configuration of the contact type roll position measuring device according to the first embodiment.

FIG. 11 is a vertical sectional view showing the system configuration of the contact type roll position measuring device according to the first embodiment of the present invention.

The contact type roll position measuring device 6 includes the L-shaped sensor rod 61 having a suitable elastic function. The sensor rod 61 has at the leading end thereof the contact tool 61a made from a hard material (ceramic or the like) exhibiting a high resistance against wearing upon contact with the work roll 1a.

The sensor rod 61 is pressed onto the work roll 1a at a specific force by a pneumatic cylinder 62. The moved amount of the sensor rod 61 is measured by a displacement sensor 63, and an output signal of the displacement sensor 63 is inputted in the information processor 13 by way of an amplifier 64. The information processor 13 calculates the change in distance between the guide rail frame 8 and the roll 1a, that is, an error of the roll profile on the basis of the equation (2) using the output of the displacement sensor 63 and the information on the movement position X of the roll grinder unit 5.

An electromagnetic valve 65 for moving the gas cylinder 62 (which may be replaced by a hydraulic cylinder) is provided in order that the sensor rod 61 is pressed at the specific force to the work roll 1a only upon measurement of the roll profile and is separated therefrom upon n o measurement of the roll profile.

The above-described contact type roll position measuring device may be replaced with a non-contact type roll position measuring device. Such a non-contact type roll position measuring device will be described with reference to FIG. 12.

Figure 12:
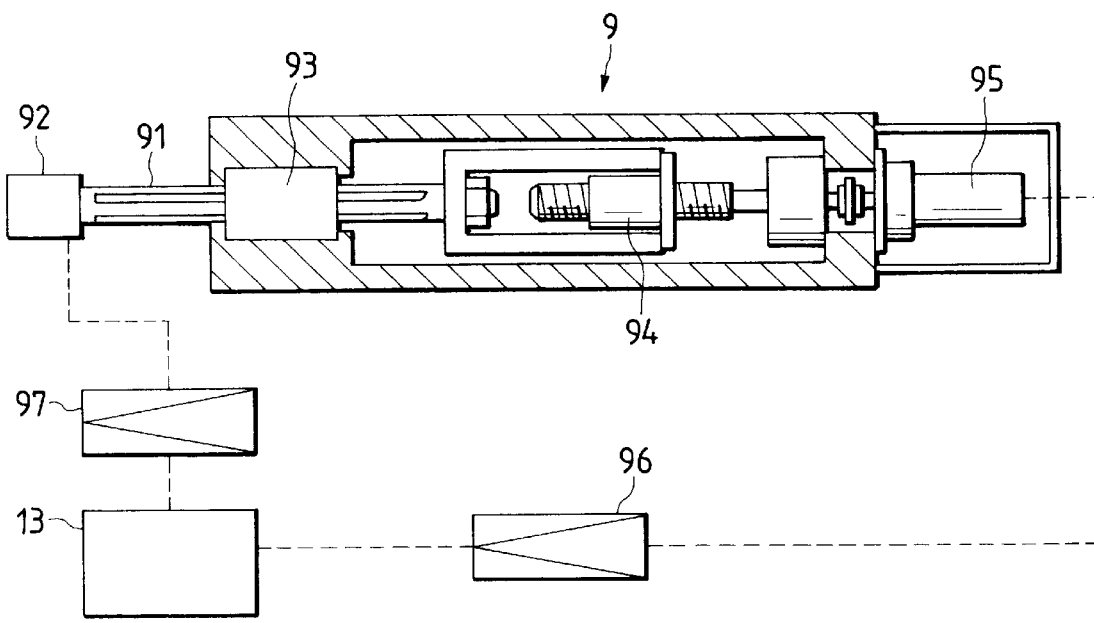
FIG. 12 is a vertical sectional view showing the system configuration of a non-contact type roll position measuring device according to the first embodiment.

FIG. 12 is a vertical sectional view showing the system configuration of the non-contact type roll position measuring device according to the first embodiment of the present invention.

A non-contact type roll position measuring device 9 includes a sensor rod 91 having at the leading end thereof a non-contact type sensor 92. As the non-contact type sensor 92, there can be used an eddy current type gap sensor. The sensor rod 91 is movable fore and aft by an AC servo-motor 95 through a ball screw 94 for keeping a gap between the work roll 1a and the non-contact type sensor 92 at a distance optimum for measurement by the non-contact type sensor 92. The sensor rod 91 is held by a spline 93 so as not to be rotated by the AC servo-motor 95, and thereby it can be moved only fore and aft. The AC servomotor 95 is controlled by the information processor 13 through a motor amplifier 96.

The change in micro-gap between the work roll 1a and the non-contact type sensor 92 is detected by the non-contact type sensor 92, and is inputted into the information processor 13 through a non-contact type sensor amplifier 97. The information processor 13 calculates the change in a distance between the guide rail frame 8 and the work roll 1a, that is, an error of the roll profile on the basis of the equation (2) using the output of the displacement sensor 92 and the information on the movement position X of the roll grinder unit 5.

Next, an online roll profile measuring system according to a second embodiment of the present invention will be described with reference to FIGS. 1 and 2.

The change in distance between the guide rail frame 8 and the work roll 1a is detected by the roll position measuring device in the first embodiment; however, in this embodiment, the change in distance is measured without use of the roll position measuring device.

As shown in FIG. 1, the load cell 15 for measuring a rolling force is provided on an upper or lower portion of the housing 4 of the rolling mill. The housing 4 is deformed within a n elastic displacement range by an increase or decrease in rolling force. Accordingly, it can be calculated by a finite element method (FEM) how the displacement of each portion is changed depending on the change in rolling force. Specifically, the rolling force is measured and also the rigidity of a portion of the housing 4 where the guide rail frame 8 is mounted is measured, and the change ΔS(X) in distance between the guide rail frame 8 and the work roll 1a is calculated by the information processor 13 on the basis of an equation (4) using the measured values of the rolling force and the rigidity.

$$\Delta S(X) = Lo \times k \tag{4}$$

Here, Lo indicates a rolling force, and k is a rigidity of a portion of the housing where the guide rail frame 8 is mounted.

Thus, a true roll profile can be obtained by eliminating, from the roll profile data S(X), a measurement error caused by displacement of the housing 4 due to the change in rolling force, that is, the change ΔS(X) calculated on the basis of the equation (4).

According to this embodiment, the roll profile from which a measurement error caused by the change in rolling condition is eliminated, can be easily obtained using the existing load cell.

Next, an online roll profile measuring system according to a third embodiment of the present invention will be described with reference to FIGS. 13 and 14.

Figure 13:
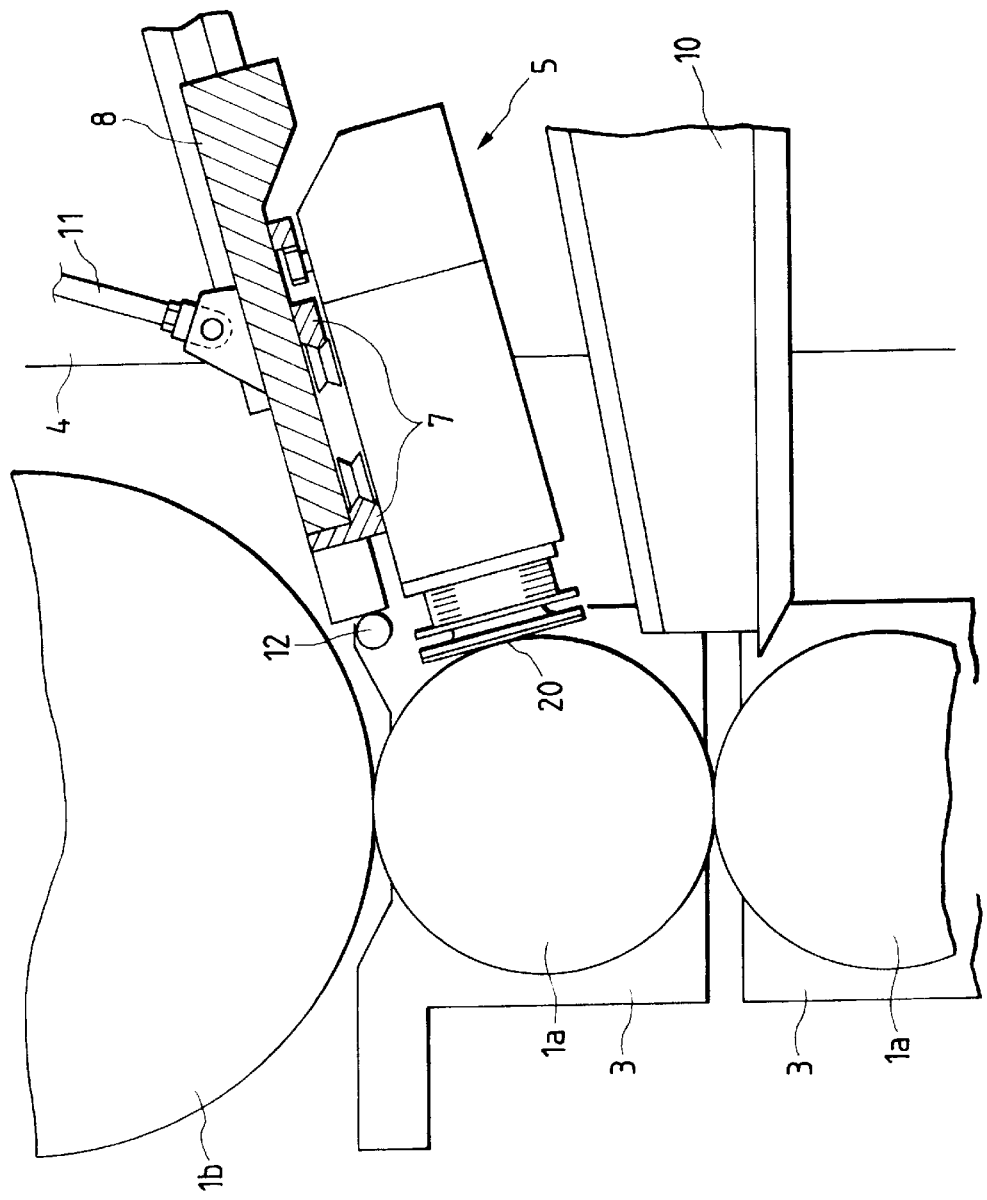
FIG. 13 is a partial sectional side view of essential portions of the rolling mill including an online roll profile measuring system according to a third embodiment.
Figure 14:
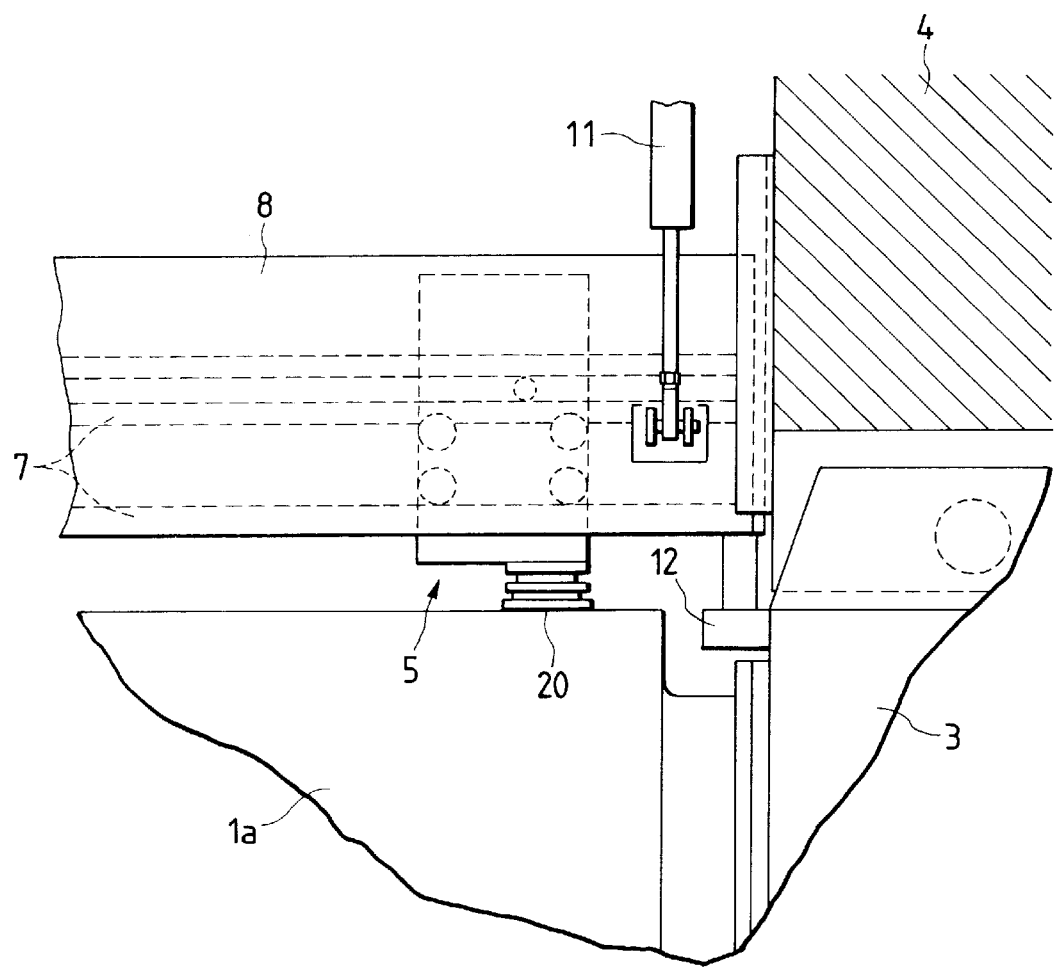
FIG. 14 is a partial sectional plan view of FIG. 13.

FIGS. 13 and 14 are a partial sectional side view and a partial sectional plan view of essential portions of the rolling mill on which the online roll profile measuring system according to the third embodiment is mounted, respectively. In these figures, parts corresponding to those in FIG. 1 or 5 are indicated by the same characters.

In this embodiment, the structure of mounting the online roll grinder unit is modified such that the distance between the guide rail frame 8 and the work roll 1a is not changed even when the housing 4 is deformed due to the change in rolling condition.

To solve the subject of keeping unchanged the distance between the guide rail frame 8 and the work roll 1a even when the rolling force is changed, it may be considered that the online roll grinder unit 5 is mounted not on the housing 4 but on the chock 3. This method, however, is inconvenient in terms of replacement of the work roll 1a.

In this embodiment, as shown in FIGS. 13 and 14, the stopper 12 for fixing the guide rail frame 8 of the online roll grinder unit 5 is mounted on the chock 3. The mounting of the stopper 12 onto the chock 3 is advantageous in that the distance between the work roll 1a and the guide rail frame 8 pressed on the stopper 12 by the cylinder 11 can be kept constant because the distance between the work roll 1a and the stopper 12 is not affected by the rolling condition, that is, it is kept constant.

The stopper 12 is mounted on each of the chocks 3 on the operating and driving sides. Two pieces of the stoppers 12 are mounted such that the guide rails 7 are in parallel to the work roll 1a.

In a rolling mill provided with no device for moving the work roll 1a in the axial direction thereof, the roll profile can be accurately measured by this method without detection of the distance between the guide rail 7 and the work roll 1a using the contact type roll position measuring device 6 or the like.

It is to be noted that in a hot rolling mill, to prevent occurrence of local wearing at an end portion of a material S to be rolled, there is generally provided a device for moving the work roll 1a in the axial direction thereof. When the work roll 1a is moved in the axial direction, the stoppers 12 mounted onto the chocks 3 are moved. Accordingly, in many cases, it is difficult to fix the guide rail frame 8.

According to this embodiment, the accurate roll profile can be obtained without use of a special sensor and the like.

While the preferred embodiments of the present invention have been described using specific terms, such description is for illustrative purposes only, and it is to be understood that changes and variations may be made without departing from the spirit or scope of the following claims.

For example, although the description has been made by example of the four-stage type rolling mill in the above embodiments, the present invention can be applied to other types of the rolling mills.

What is claimed is:

1. In an online roll profile measuring system comprising:
   a roll grinder unit including a rotary grinding wheel positioned opposite to a work roll for grinding said work roll, a grinding wheel driving device for rotating said rotary grinding wheel, and a grinding wheel feeding device for pressing said grinding wheel to said work roll; and
   a traversing device for moving said roll grinder unit in the axial direction of said work roll relative to a guide rail frame fixed on a housing for holding said work roll;
   wherein a roll profile is measured, simultaneously with grinding of said work roll, on the basis of movement amounts of said grinding wheel feeding device and said traversing device;
   the improvement comprising:
   a measuring means for measuring the amount of displacement of said housing depending on the chance in rolling condition during measurement of the roll profile;
   said measuring means comprising a roll position measuring means mounted on said guide rail frame for measuring the change in distance between said guide rail frame and said work roll;
   said roll position measuring means comprising a contact tool which is brought in contact with said work roll and displaced on the basis of the change in distance between said guide rail frame and said work roll, and a displacement sensor for detecting the displaced amount of said contact tool; and
   a processing means for correcting the roll profile obtained during rolling on the basis of the amount of the displacement of said housing measured by said measuring means.

2. In an online roll profile measuring system comprising:
   a roll grinder unit including a rotary grinding wheel positioned opposite to a work roll for grinding said work roll, a grinding wheel driving device for rotating said rotary grinding wheel, and a grinding wheel feeding device for pressing said grinding wheel to said work roll; and
   a traversing device for moving said roll grinder unit in the axial direction of said work roll relative to a guide rail frame fixed on a housing for holding said work roll;
   wherein a roll profile is measured, simultaneously with grinding of said work roll, on the basis of movement amounts of said grinding wheel feeding device and said traversing device;
   the improvement comprising:
   a measuring means for measuring the amount of displacement of said housing depending on the change in rolling condition during measurement of the roll profile,
   said measuring means comprising a roll position measuring means mounted on said guide rail frame for measuring the change in distance between said guide rail frame and said work roll;
   said roll position measuring means comprising a non-contact type sensor disposed in proximity to said work roll; and
   a processing means for correcting the roll profile obtained during rolling on the basis of the amount of the displacement of said housing measured by said measuring means.

3. In an online roll profile measuring system comprising:
   a roll grinder unit including a rotary grinding wheel positioned opposite to a work roll for grinding said work roll, a grinding wheel driving device for rotating said rotary grinding wheel, and a grinding wheel feeding device for pressing said grinding wheel to said work roll; and
   a traversing device for moving said roll grinder unit in the axial direction of said work roll relative to a guide rail frame fixed on a housing for holding said work roll;
   wherein a roll profile is measured, simultaneously with grinding of said work roll, on the basis of movement amounts of said grinding wheel feeding device and said traversing device;
   the improvement wherein
   said guide rail frame is fixed on a chock for rotatably fixing said work roll in such a manner as to be pressed to said chock; and
   a roll profile of said work roll during rolling is measured simultaneously with grinding of said work roll by said roll grinder unit moved in the axial direction of said work roll.

4. An online roll profile measuring method using an online roll profile measuring system comprising:
   a roll grinder unit including a rotary grinding wheel positioned opposite to a work roll for grinding said work roll, a grinding wheel driving device for rotating said rotary grinding wheel, a grinding wheel feeding device for pressing said grinding wheel to said work roll; and
   a traversing device for moving said roll grinder unit in the axial direction of said work roll relative to a guide rail frame fixed on a housing for holding said work roll;
   wherein a roll profile is measured, simultaneously with grinding of said work roll, on the basis of movement amounts of said grinding wheel feeding device and said traversing device; comprising the steps of:

measuring the amount of displacement of said housing depending on the change in rolling condition during measurement of the roll profile using roll position measuring means comprised of a contact tool which is brought into contact with said work roll and displaced on the basis of a change in distance between said guide rail frame and said work roll, and a displacement sensor for detecting the displacement amount of said contact tool; and correcting the roll profile obtained during rolling on the basis of the amount of the displacement of said housing measured by said measuring means using a processing means.

5. An online roll profile measuring method using an online roll profile measuring system comprising:

a roll grinder unit including a rotary grinding wheel positioned opposite to a work roll for grinding said work roll, a grinding wheel driving device for rotating said rotary grinding wheel, a grinding wheel feed device for pressing said grinding wheel to said work roll; and a traversing device for moving said roll grinder unit in the axial direction of said work roll relative to a guide rail frame fixed on a housing for holding said work roll;

wherein a roll profile is measured, simultaneously with grinding of said work roll, on the basis of movement amounts of said grinding wheel feeding device and said traversing device; comprising the steps of:

measuring the amount of displacement of said housing depending on the change in rolling condition during measurement of the roll profile using roll position measuring means comprised of a non-contact type sensor disposed in proximity to said work roll; and correcting the roll profile obtained during rolling on the basis of the amount of the displacement of said housing measured by said measuring means using a processing means.

* * * * *